(12) United States Patent
Suen

(10) Patent No.: US 11,601,421 B1
(45) Date of Patent: Mar. 7, 2023

(54) IDENTITY MANAGEMENT SYSTEM

(71) Applicant: Wells Fargo Bank, N.A., San Francisco, CA (US)

(72) Inventor: Darrell L. Suen, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 260 days.

(21) Appl. No.: 16/909,651

(22) Filed: Jun. 23, 2020

Related U.S. Application Data

(63) Continuation of application No. 16/180,761, filed on Nov. 5, 2018, now Pat. No. 10,721,227, which is a continuation of application No. 14/972,986, filed on Dec. 17, 2015, now Pat. No. 10,129,252.

(51) Int. Cl.
    *H04L 9/40*     (2022.01)

(52) U.S. Cl.
    CPC ...... *H04L 63/0861* (2013.01); *H04L 63/0807* (2013.01); *H04L 63/0815* (2013.01); *H04L 63/0853* (2013.01)

(58) Field of Classification Search
    CPC ............. H04L 63/0861; H04L 63/0807; H04L 63/0815; H04L 63/0853
    See application file for complete search history.

(56) References Cited

U.S. PATENT DOCUMENTS

| | | | |
|---|---|---|---|
| 7,908,216 B1 | 3/2011 | Davis et al. | |
| 8,689,287 B2 | 4/2014 | Bohmer et al. | |
| 9,374,370 B1 * | 6/2016 | Bent, II | H04W 12/068 |
| 9,646,150 B2 * | 5/2017 | Toth | G06F 21/45 |
| 2002/0176583 A1 * | 11/2002 | Buttiker | H04L 9/006 380/282 |
| 2006/0053296 A1 * | 3/2006 | Busboom | H04L 63/08 726/4 |
| 2006/0235796 A1 * | 10/2006 | Johnson | G06Q 20/4014 705/26.1 |
| 2007/0136603 A1 * | 6/2007 | Kuecuekyan | H04L 63/0884 713/185 |
| 2007/0208869 A1 * | 9/2007 | Adelman | H04L 63/0823 709/229 |

(Continued)

OTHER PUBLICATIONS

Alliance, T.F., 2014. Fido 1.0 final specification have arrived. Tech. Rep., Dec.

(Continued)

*Primary Examiner* — James R Turchen
(74) *Attorney, Agent, or Firm* — Foley & Lardner LLP

(57) ABSTRACT

Identity management is disclosed that allows authentication of a user for a third party by way of an encrypted token. A biometric signature can be requested for a user of a user device. In response, an encrypted token can be generated based at least in part on the biometric signature. The encrypted token can then be provided back to the user device, which can save the encrypted token to a secure location on the user device accessible by biometric authentication of the user on the user device. An authentication request can be provided from a third party which includes an encrypted token. A determination can be made regarding whether user identity can be confirmed based on the encrypted token. An indication of whether the user identity was confirmed or unconfirmed can then be communicated in response to the authentication request.

14 Claims, 9 Drawing Sheets

(56) References Cited

U.S. PATENT DOCUMENTS

| | | | | |
|---|---|---|---|---|
| 2008/0289020 | A1* | 11/2008 | Cameron | H04L 9/3247 726/9 |
| 2009/0183008 | A1* | 7/2009 | Jobmann | G06F 21/34 235/382 |
| 2012/0214444 | A1* | 8/2012 | McBride | H04L 63/08 455/411 |
| 2013/0036480 | A1 | 2/2013 | Anderson et al. | |
| 2013/0047266 | A1* | 2/2013 | Radhakrishnan | H04L 63/105 726/28 |
| 2013/0061055 | A1 | 3/2013 | Schibuk | |
| 2013/0174241 | A1* | 7/2013 | Cha | H04L 63/0815 726/7 |
| 2013/0305050 | A1* | 11/2013 | Johnson | H04L 9/3215 713/175 |
| 2013/0318359 | A1 | 11/2013 | Morris et al. | |
| 2014/0108801 | A1* | 4/2014 | McBride | H04L 63/12 713/168 |
| 2014/0282868 | A1* | 9/2014 | Sheller | G06F 21/316 726/3 |
| 2014/0289833 | A1* | 9/2014 | Briceno | H04L 9/006 726/5 |
| 2015/0215297 | A1* | 7/2015 | Rathod | G06Q 20/354 726/7 |
| 2015/0310221 | A1* | 10/2015 | Lietz | G06F 21/6209 713/193 |
| 2015/0312041 | A1* | 10/2015 | Choi | H04L 63/0861 713/175 |
| 2015/0319156 | A1* | 11/2015 | Guccione | H04L 63/083 726/7 |
| 2015/0348022 | A1* | 12/2015 | Khan | G06Q 20/385 705/44 |
| 2016/0065563 | A1* | 3/2016 | Broadbent | H04L 63/0281 726/9 |
| 2016/0134599 | A1* | 5/2016 | Ross | H04L 63/0815 713/168 |
| 2016/0180078 | A1* | 6/2016 | Chhabra | G06F 21/57 726/19 |
| 2016/0196542 | A1* | 7/2016 | Chandrasekaran | G06Q 30/04 705/40 |
| 2016/0285858 | A1* | 9/2016 | Li | H04L 63/10 |
| 2016/0323280 | A1* | 11/2016 | Sade | H04L 63/0807 |
| 2016/0344710 | A1* | 11/2016 | Khan | H04L 63/061 |
| 2016/0366122 | A1* | 12/2016 | Rykowski | H04L 63/0815 |
| 2018/0375849 | A1* | 12/2018 | Koskimies | H04L 9/3234 |

OTHER PUBLICATIONS

Coombs, R., 2015. Securing the future of authentication with ARM TrustZone-based trusted execution environment and fast identity online (FIDO). ARM White paper.
FIDO: Fast Identity Online Alliance Privacy Principles Whitepaper; Feb. 2014.
Google's ATAP Wants to Eliminate Passwords for Good; Frederic Lardinois; May 29, 2015; www.techcrunch.com/2015/05/29/googles-atap-wants-to-eliminate-passwords-for-good/.
Jakobsson, M., Taveau, S. and Extricatus, L.L.C., 2012. The Case for Replacing Passwords with Biometrics. Mobile Security Technologies, pp. 1-6.
Lardinois. Google's ATAP Wants to Eliminate Passwords for Good; May 29, 2015; www.techcrunch.com/2015/05/29/googles-atap-wants-to-eliminate-passwords-for-good/.
Lindemann, R., 2013. The evolution of authentication. In ISSE 2013 Securing Electronic Business Processes (pp. 11-19). Springer Vieweg, Wiesbaden.
Stajano, F., Mar. 2011, Pico: No more passwords!. In International Workshop on Security Protocols (pp. 49-81) . Springer, Berlin,Heidelberg.

* cited by examiner

IDENTITY MANAGEMENT SYSTEM

CROSS REFERENCE TO RELATED APPLICATIONS

This application is a continuation of U.S. patent application Ser. No. 16/180,76, filed Nov. 5, 2018, and entitled "IDENTITY MANAGEMENT SYSTEM," which is a continuation of U.S. application Ser. No. 14/972,986 filed on Dec. 17, 2015 and entitled "IDENTITY MANAGEMENT SYSTEM." The entireties of the above applications are incorporated herein by reference.

BACKGROUND

As e-commerce and electronic communications continue to grow so does the concern about consumer privacy and the threat of electronic theft and fraud. Current systems and communications use user ID's and passwords to provide means of security. These security measures, however, do not provide adequate privacy for consumers who wish to protect their privacy. In addition, these security measures do not provide adequate protection from online threats and third-party data breach for both consumers and financial institutions.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In accordance with one aspect of the disclosure, a system comprises a processor coupled to the memory that includes instructions that when executed by the processor cause the processor to request a biometric signature for a user from a user device, generate an encrypted token based at least in part on the biometric signature, and return the encrypted token to the user device that saves the encrypted token to a secure location on the user device accessible by biometric authentication of the user on the user device. The instructions can further cause the processor to determine whether user identity can be confirmed based on a received encrypted token in conjunction with a validation request from a third party and communicate whether the user identity was confirmed or unconfirmed in response to the validation request. In one instance, the encrypted token comprises the biometric signature of the user, and instructions can cause the processor to decrypt the encrypted token and compare the biometric signature of the encrypted token with the biometric signature of the user to determine whether the user identity is confirmed.

In accordance with another aspect, a method is disclosed that comprises requesting a biometric signature for a user from a user device, generating an encrypted token based at least in part on the biometric signature, and providing the encrypted token to the user device that saves the encrypted token to a secure location on the user device accessible by biometric authentication of the user on the user device. Further the method comprises determining whether user identity can be confirmed based on a received encrypted token in conjunction with an authentication request from a third part and communicating whether the user identity was confirmed or unconfirmed in response to the authentication request. The method can further comprise decrypting the encrypted token to revealing a biometric signature and comparing the biometric signature of the encrypted token with the biometric signature of the user to determine whether the user is confirmed. In one instance, the method can further comprise communicating data regarding the user with confirmation of the user identity.

According to yet another aspect, a method is disclosed that comprises executing, on a processor, instructions that cause the processor to perform operation. The operations comprise requesting a biometric signature of a user from a user device, generating an encrypted token based at least in part on the biometric signature, and providing the encrypted token to the user device that saves the encrypted token to a secure location on the user device accessible by biometric authentication of the user on the user device. Further, the operations comprise decrypting a received encrypted token in conjunction with an authentication request from a third party to reveal a biometric signature, confirming identity of the user when the biometric signature matches the biometric signature of the user, and communicating confirmation of the identity of the user in response to the authentication request.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

As used herein, the term "inference" or "infer" refers generally to the process of reasoning about or inferring states of the system, a component, a module, the environment, and/or user devices from a set of observations as captured through events, reports, data and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

Figure 1:
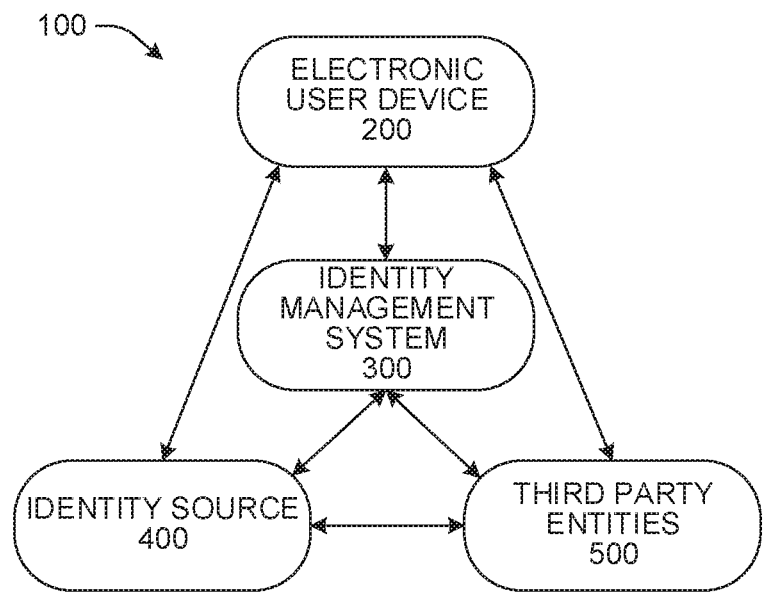
FIG. 1 is a block diagram illustration of an e-commerce system in accordance with an aspect of the innovation.

Referring now to the drawings, FIG. 1 is a block diagram illustration of an e-commerce system 100 utilizing an electronic user device (e.g., computer, mobile phone, tablet, etc.) 200 and incorporating an innovative identity management system 300 that overcomes the above mentioned disadvantages by using a trusted authoritative identity source (e.g., government agency, financial institution, credit bureau, etc.) 400 to validate an identity of a user of the electronic device 200 for third party entities (e.g., a business, corporation, merchant, financial institution, any e-commerce entity, etc.) 500. The innovative identity management system 300 improves identity validation via the user device 200 by providing an improved secure validation process thereby facilitating e-commerce transactions that require identity validation/verification, such as but not limited to, on-line transfers, on-line purchases, etc. It is to be understood that although the innovative identity management system is described and illustrated with a separate identity source and third party entity, in an alternative embodiment, the identity source and third party entity may be one in the same.

Figure 2:
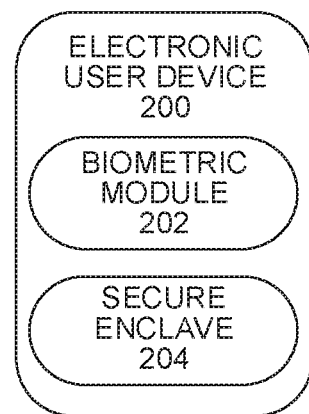
FIG. 2 is a non-limiting illustration of user device shown in block diagram form in accordance with an aspect of the innovation.

Referring to FIG. 2, the user device 200 includes a biometric module 202 and a secure enclave module 204. The biometric module 202 allows the user to generate (e.g., scan, download, etc.) a biometric signature (print) 206 (see also FIG. 4) of the user and place the biometric signature onto the user device 200. The biometric signature 206 may include any biometric, such as but not limited to, fingerprint, palm print, palm veins, hand geometry, face recognition, iris and/or retina recognition, voice, gait, scent, etc. As will be explained further below, the secure enclave module 204 stores a token generated by the identity source 400.

Figure 3:
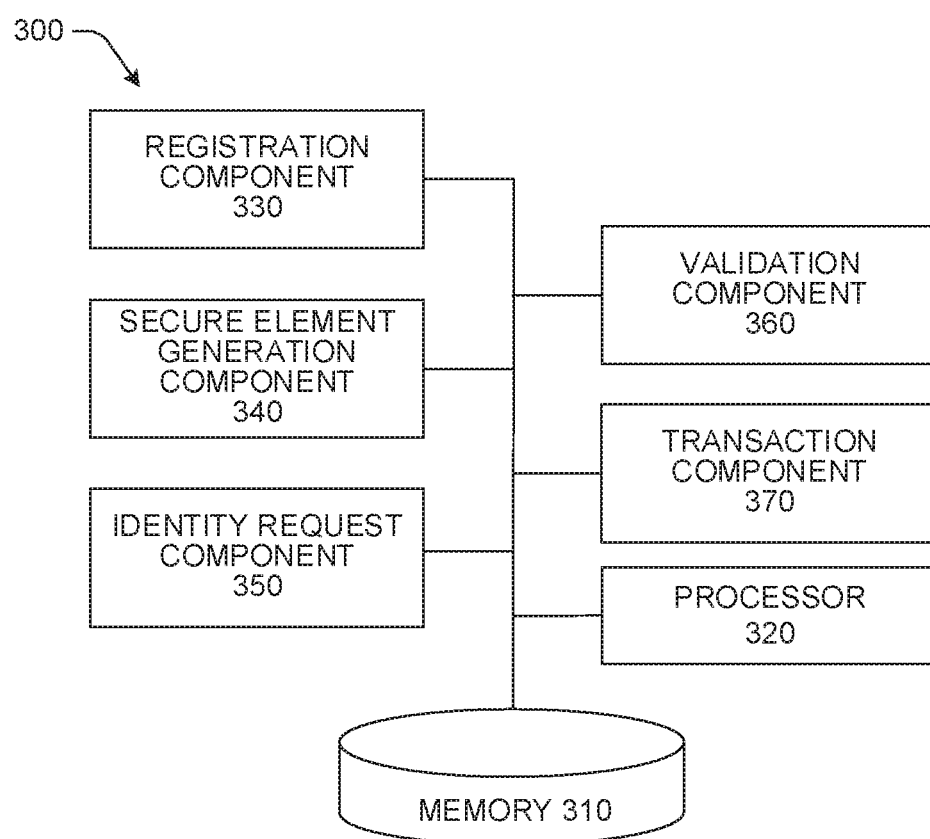
FIG. 3 is a non-limiting illustration of an identity management system shown in block diagram form in accordance with an aspect of the innovation.

FIG. 3 is a block diagram illustration of the identity management system 300 in accordance with an aspect of the innovation. The identity management system 300 may include at least one memory 310 that may store computer executable components and/or computer executable instructions. The identity management system 300 may also include at least one processor 320, communicatively coupled to the at least one memory 210. The at least one processor 320 may facilitate execution of the computer executable components and/or the computer executable instructions stored in the memory 310. The term "coupled" or variants thereof may include various communications including, but not limited to, direct communications, indirect communications, wired communications, and/or wireless communications (e.g., with specialized banking machines and systems).

It is noted that although the one or more computer executable components and/or computer executable instructions may be illustrated and described herein as components and/or instructions separate from the memory 310 (e.g., operatively connected to the memory 310), the various aspects are not limited to this implementation. Instead, in accordance with various implementations, the one or more computer executable components and/or the one or more computer executable instructions may be stored in (or integrated within) the memory 310. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple specialized components and/or as multiple instructions without departing from the example embodiments.

Figure 4:
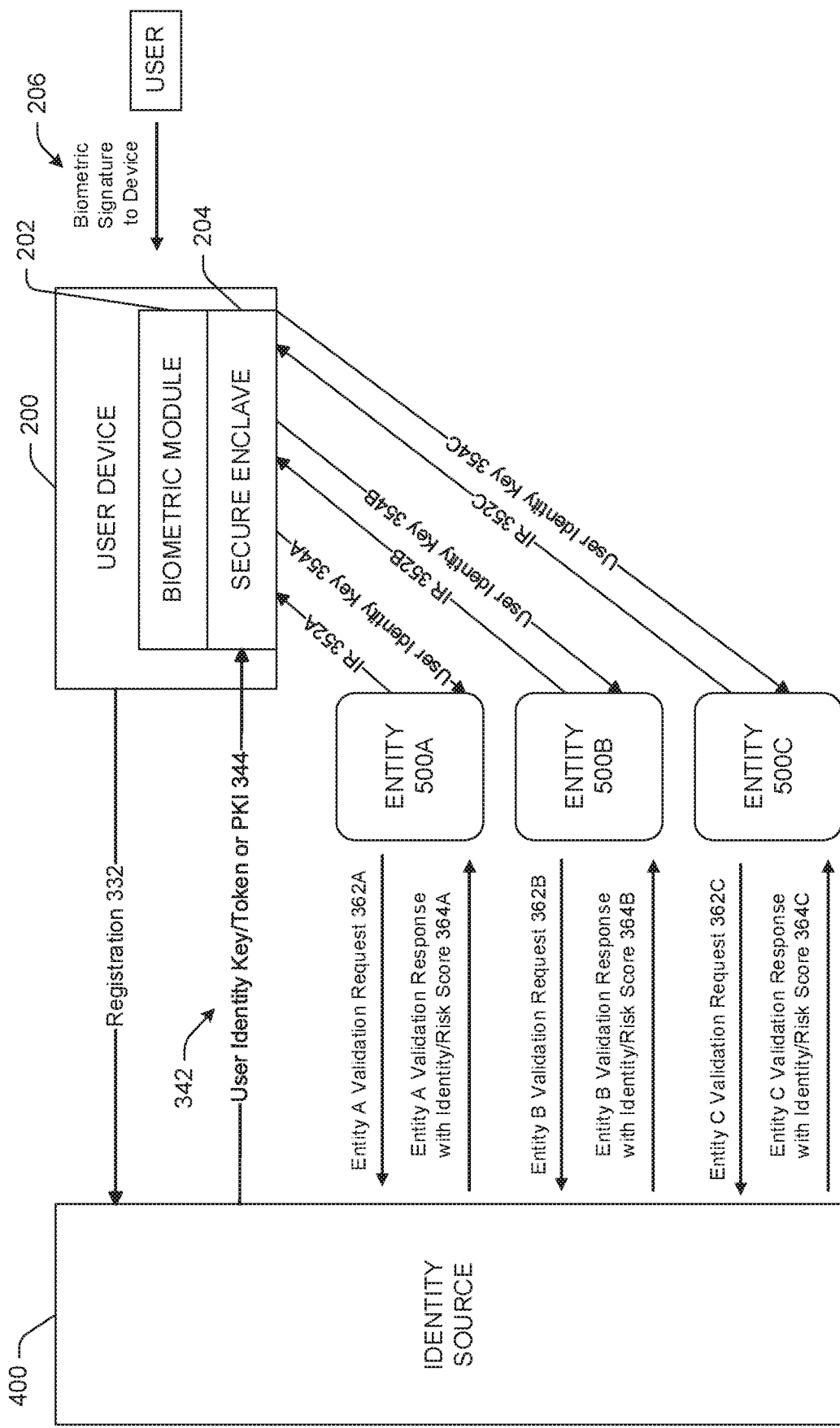
FIG. 4 is a non-limiting illustration illustrating an operation of the identity management system in accordance with an aspect of the innovation.

Still referring to FIG. 3 and also to FIG. 4, the identity management system 300 may include a registration component 330 that allows a user to enroll or register 332 their electronic device(s) 200 with the identity source 400. The user registers their user device 200 with the identity source 400 with their biometric signature 206 described above. In other words, the biometric signature 206 of the user is transmitted and stored with the identity source 400.

The identity management system 300 further includes a secure element generation component 340. Once the user device 200 is registered, the identity source 400 generates an encrypted user identity element 342 (e.g., token, key (Public Key Infrastructure (PKI) using public key cryptography), etc.). The encrypted secure element 342 facilitates secure identification of the user. The identity source 400 then transmits 344 the encrypted user identity element 342 to the user device 200 where the user device stores the encrypted user identity element 342 onto the secure enclave 204 of the user's device 200. The encrypted user identity element 342 incorporates a hashed biometric print of the user such that the encrypted user identity element 342 embodies the biometric signature 206 of the user that was used to register the user device 200. Thus, as will be explained further below, the identity source 400 compares the biometric signature 206 on the encrypted user identity element 342 with the stored biometric signature to validate the identity of the user.

The identity management system 300 further includes an identity request component 350 that allows third party entities 500 to send an identity request (IR) requesting proof of identity of the user of the user device 200. Thus, the third party entity 500 is requesting access to the encrypted user identity element 342. As shown in FIG. 4, one or more third party entities (for example, Entities 500A, 500B, 500C) may send separate and independent identity requests 352A, 352B, 352C to the user device 200 requesting proof of identity of the user. The user then unlocks the secure enclave 204 of the user device 200 by inputting their biometric signature into the user device 200. The user device 200 then separately and independently transmits 354A, 354B, 354C the encrypted secure element 342 to any third party entity 500 (e.g., third party entities 500A, 500B, 500C) requesting proof of identity.

The identity management system 300 further includes a validation/authentication component 360 that allows the third party entities 500 to validate the identity of the user of the user device 200 via the identity source 400. For example, after the user transmits the encrypted user identity element 342 to the third party entities 500A, 500B, 500C, as mentioned above, the third party entities 500A, 500B, 500C transmit a validation request 362A, 362B, 362C to the identity source 400. The validation request 362 comprises transmitting the encrypted user identity element 342 to the identity source 400. The identity source 400 compares the biometric signature on the encrypted user identity element 342 with the biometric signature 206 registered with the user device 200. If the two biometric signatures match, the identity source 400 transmits a validation 364A, 364B, 364C to the third-party entities 500A, 500B, 500C confirming the identity of the user of the user device 200.

The validation may or may not include additional information about the user, such as but not limited to, a credit score, credit history, a risk score, etc. If the two biometric signatures do not match, the identity source 400 transmits an invalidation signal to the entities 500A, 500B, 500C that the user is not the user of the user device 200. As illustrated in FIG. 4, each third-party entity (Entities A-C) 500 transmits and receives their own independent validation request and validation response respectively.

Still referring to FIG. 3, the identity management system 300 may further include a transaction component 370 in accordance with an aspect of the innovation. The transaction component 370 facilitates electronic transactions between the user device 200, the identity source 400, and the third-party entities 500, as described herein.

Figure 5:
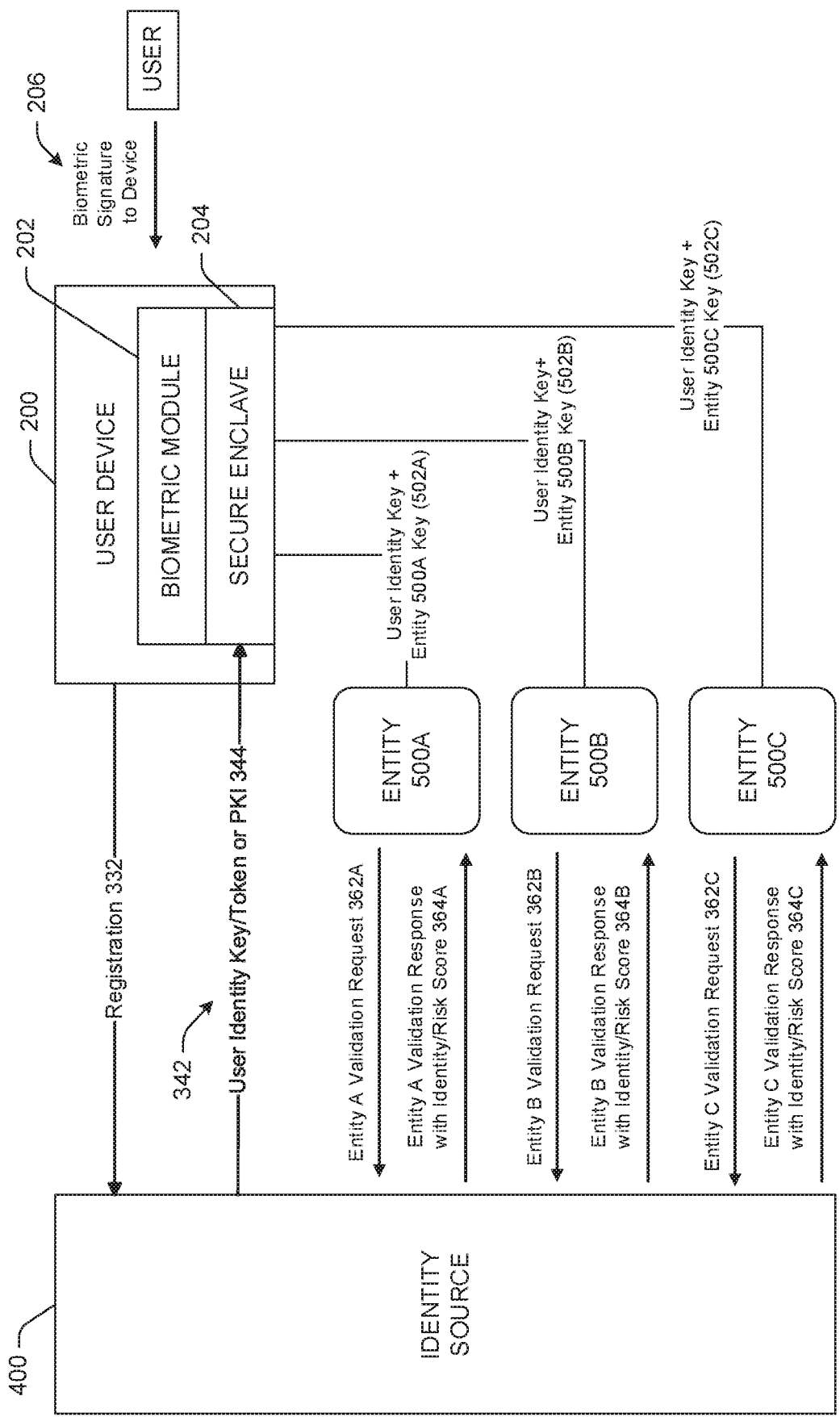
FIG. 5 is a non-limiting illustration illustrating an operation of an alternative embodiment of the identity management system in accordance with an aspect of the innovation.

In an alternative embodiment illustrated in FIG. 5, each third party entity 500 may store their own secure element (e.g., key, token as described herein) hereinafter referred to as an encrypted entity element 502 in the secure enclave 204 on the user device 200. Thus, the secured enclave 204 stores both the encrypted user identity element 342 provided by the identity source 400 described above and the encrypted entity element 502 placed on the user's device 200 by the third-party entity 500. Therefore, during the validation process, the biometric signature of the encrypted user identity element 342 and a biometric signature of the encrypted entity element 502 must match the biometric signature registered with the identity source 400 and the encrypted entity element 502. In this embodiment, in the event of a security compromise of the user identity or user device, the third-party entities 500 can update encrypted entity element 502 (e.g., rotate the tokens/key) as needed to secure the third party access.

Figure 6A:
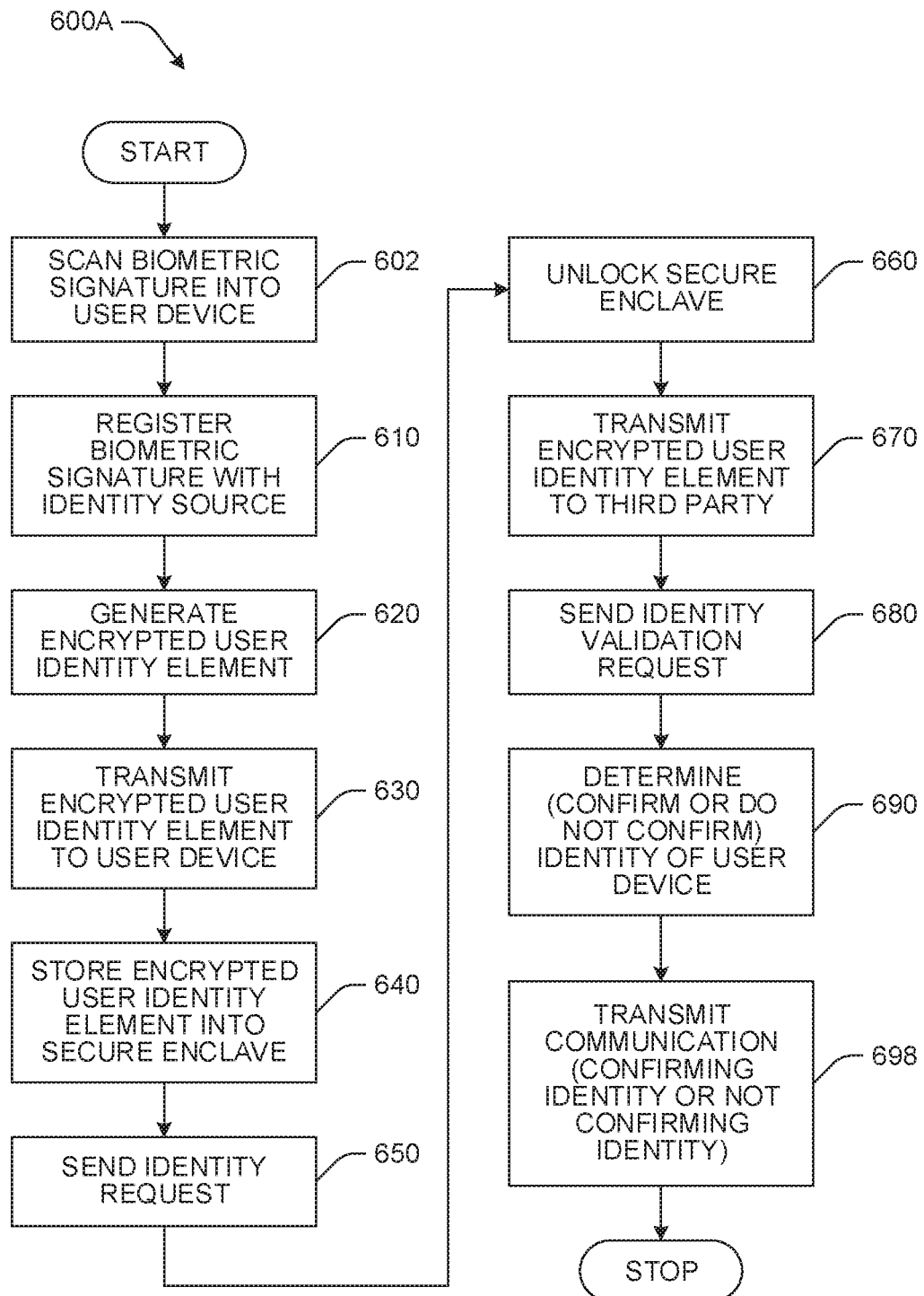
FIGS. 6A, 6B, and 6C illustrate example, non-limiting block diagrams of a method of facilitating electronic transactions in accordance with an aspect of the innovation.
Figure 6B:
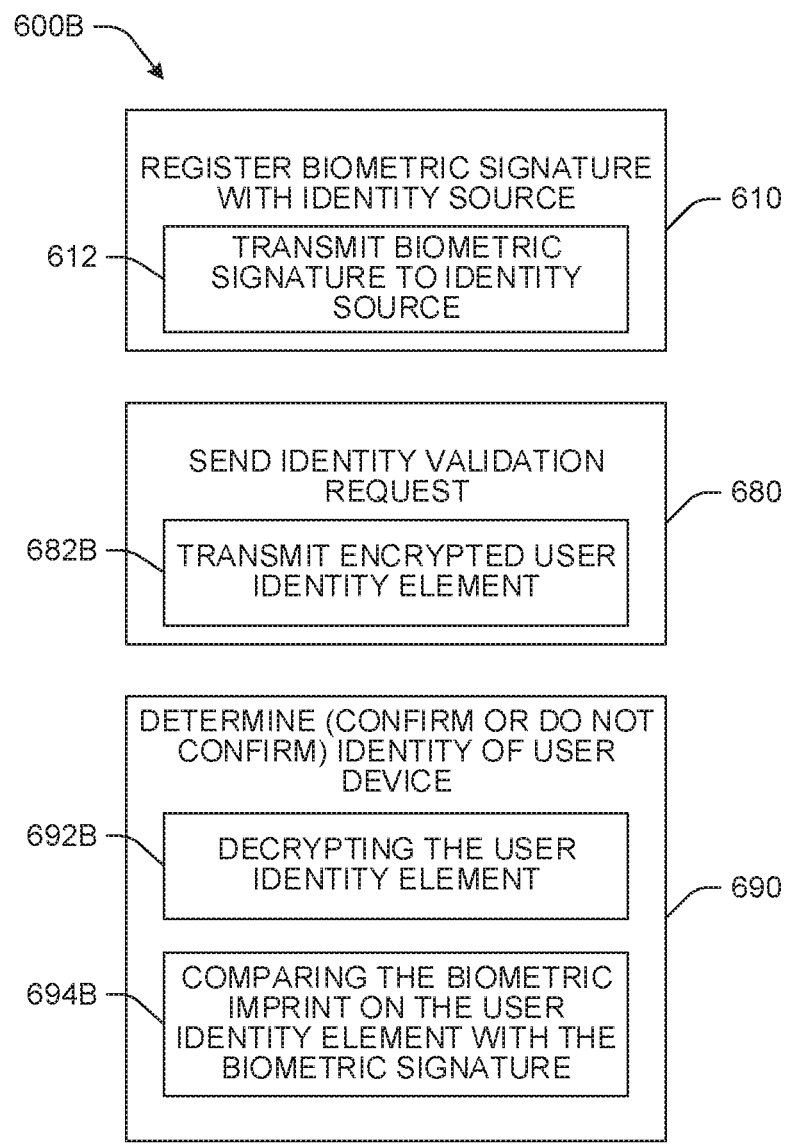
Figure 6C:
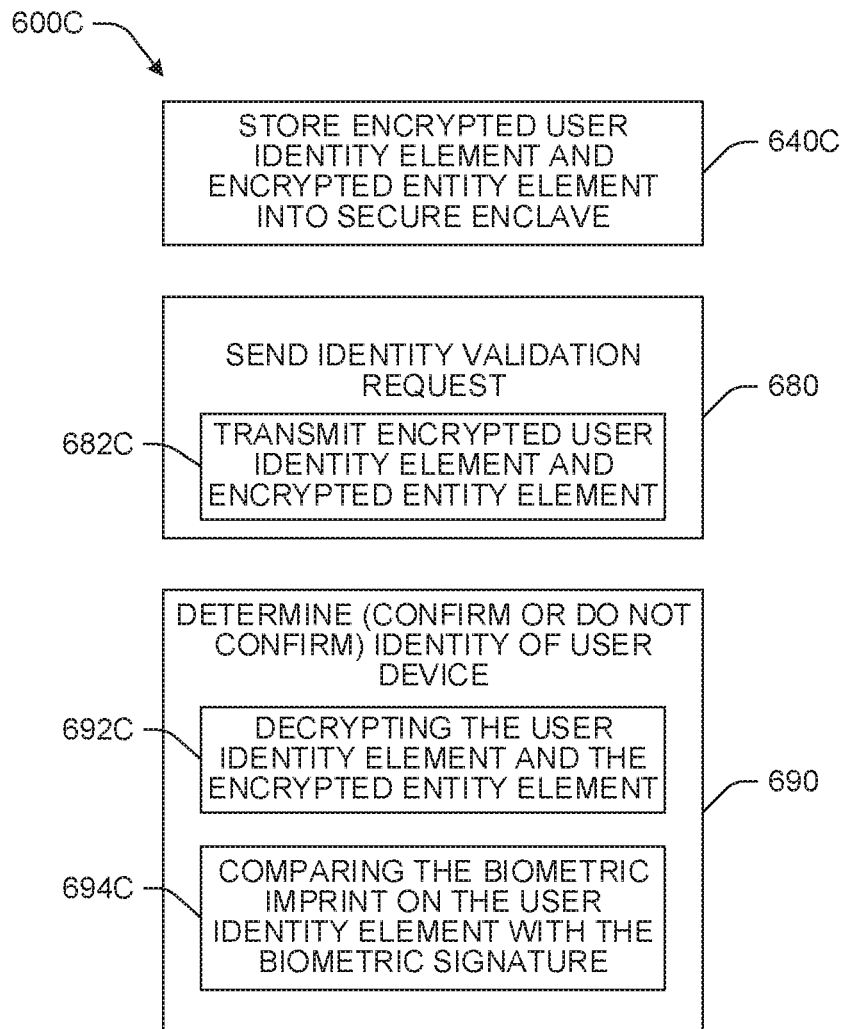

Referring to FIGS. 6A, 6B, and 6C, methods that may be implemented in accordance with the disclosed subject matter will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

The various aspects (e.g., in connection with automatic implementation of various portions of actions/events, completion of a prior action/event, and so forth) may employ various artificial intelligence-based schemes for carrying out various aspects thereof. For example, a process for determining if a particular action should follow a current action may be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification may employ a probabilistic and/or statistical-based analysis (e.g., factoring into the analysis utilities and costs) to forecast or infer an action that should be employed to determine what actions should be automatically performed what actions should be performed after receiving confirmation from the user to proceed. In the case of actions/events, for example, attributes may be identification of a user device and/or the user and the classes are criteria related to known information (e.g., historical information) about the user device and/or user.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing fraud trends, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria when to provide a suggested action (e.g., take medication), when to complete a current action, which actions to implement in sequence, and so forth. The criteria may include, but is not limited to, historical information, user preferences, expected actions, and so forth.

Additionally or alternatively, an implementation scheme (e.g., a rule, a policy, and so on) may be applied to control and/or regulate events and resulting recommendations, subsequent events, and so forth. In some implementations, based upon a predefined criterion, the rules-based implementation may automatically and/or dynamically implement one or more portions of an event/action. In response thereto, the rule-based implementation may automatically interpret and carry out functions associated with the event/action by employing a predefined and/or programmed rule(s) based upon any desired criteria.

FIGS. 6A, 6B, and 6C are non-limiting block diagram illustrations 600A, 600B, 600C of a method of validating a user identity in an e-commerce transaction using an authoritative identity source in accordance with an aspect of the innovation. At 602, the user places (e.g., scans, downloads, etc.) at least one of their biometric signatures 206 onto their user device 200. At 610, the user registers their biometric signature 206 with the identity source 400, as defined herein. At 620, the identity source 400 generates the encrypted user identity element 342, as described herein. At 630 the encrypted user identity element 342 is transmitted to the user device 200. At 640, the user device 200 stores the encrypted user identity element 342 in the secure enclave 204 of the user device 200. At 650, the third party entity 500 transmits an identity request 352 to the user device 200. At 660, the user unlocks the secure enclave 204 of the user device 200 via the biometric module 202 on the user device 200, thereby allowing the third party entity 500 access to the user identity element 342 stored in the secure enclave 204. At 670, the user device 200 transmits the encrypted user identity element 342 to the third party entity 500. At 680, the third party entity 500 transmits an identity validation request to the identity source 400. At 690, the identity source 400 determines if the identity of the user is confirmed/validated or not confirmed/not validated. At 698, the identity source 400 transmits a communication to the third party 500. The communication may be a validation if the identity source 400 determines that the identity of the user device is confirmed. Or, the communication may inform the third party entity 500 that the identity of the user device is not confirmed.

Referring to FIG. 6B, registering their biometric signature 206 with the identity source 400, at 610 includes at 612, transmitting their biometric signature to the identity source 400. Transmitting a validation request to the identity source, at 680 includes at 682B, transmitting the encrypted user identity element 342 to the identity source 400. Confirming/validating or not confirming/validating the identity of the user of the user device 200, at 690 includes at 692B, decrypting the user identity element 342 and at 694B comparing the biometric imprint on the user identity element 342 with the registered biometric signature 206 stored in the identity source 400.

Referring to FIG. 6C, in the alternative embodiment described above and illustrated in FIG. 4, storing the encrypted user identity element 342 in the secure enclave 204 of the user device 200, at 640C, also includes storing the encrypted entity element 502 in the secure enclave 204 of the user device 200. In addition, transmitting a validation request to the identity source, at 680 not only includes at 682C, transmitting the encrypted user identity element 342 to the identity source 400, but also transmitting the encrypted entity element 502 to the identity source 400. Still further, confirming/validating or not confirming/validating the identity of the user of the user device 200, at 690 includes at 692C, not only decrypting the user identity element 342, but also decrypting the encrypted entity element 502. And at 694C, comparing not only the biometric imprint on the user identity element 342 with the registered biometric signature 206 stored in the identity source 400, but also comparing the biometric imprint on the encrypted entity element 502 with the registered biometric signature 206 stored in the identity source 400.

The innovative identity management system disclosed herein provides several advantages over current identity/authentication systems mentioned above. For example, the innovation creates a consumer focused, shared authentication platform native to the financial services industry. In addition, the innovation uses a financial institution (FI) authorized multi-factor authentication where there is no reliance on username/password systems. Still further, the innovative system facilitates the sharing of relevant metadata in real-time to aggregate, correlate and ultimately prevent unauthorized access and continuously freshens customer data through a centralized hub of trusted sources. For example, a red flag raised at Bank A will be available to Bank B at critical moments. The innovation uses data analytics to identify anomalous behavior across institutions to proactively guard against account takeover, bust out and other threats and integrates seamlessly with FI mobile apps and FI website logins.

Another advantage is that the innovative system is tokenized, which is an effective, mature control for protecting customer data and all data exchanges. The system can be fully controlled and operated by the financial services industry and the customer data remains owned by the individual financial institution. In addition, .BANK and .INSURANCE provide an opportunity to connect a vetted and trusted community where they may retain backwards compatibility to legacy .COM web properties provided they meet eligibility requirements.

Figure 7:
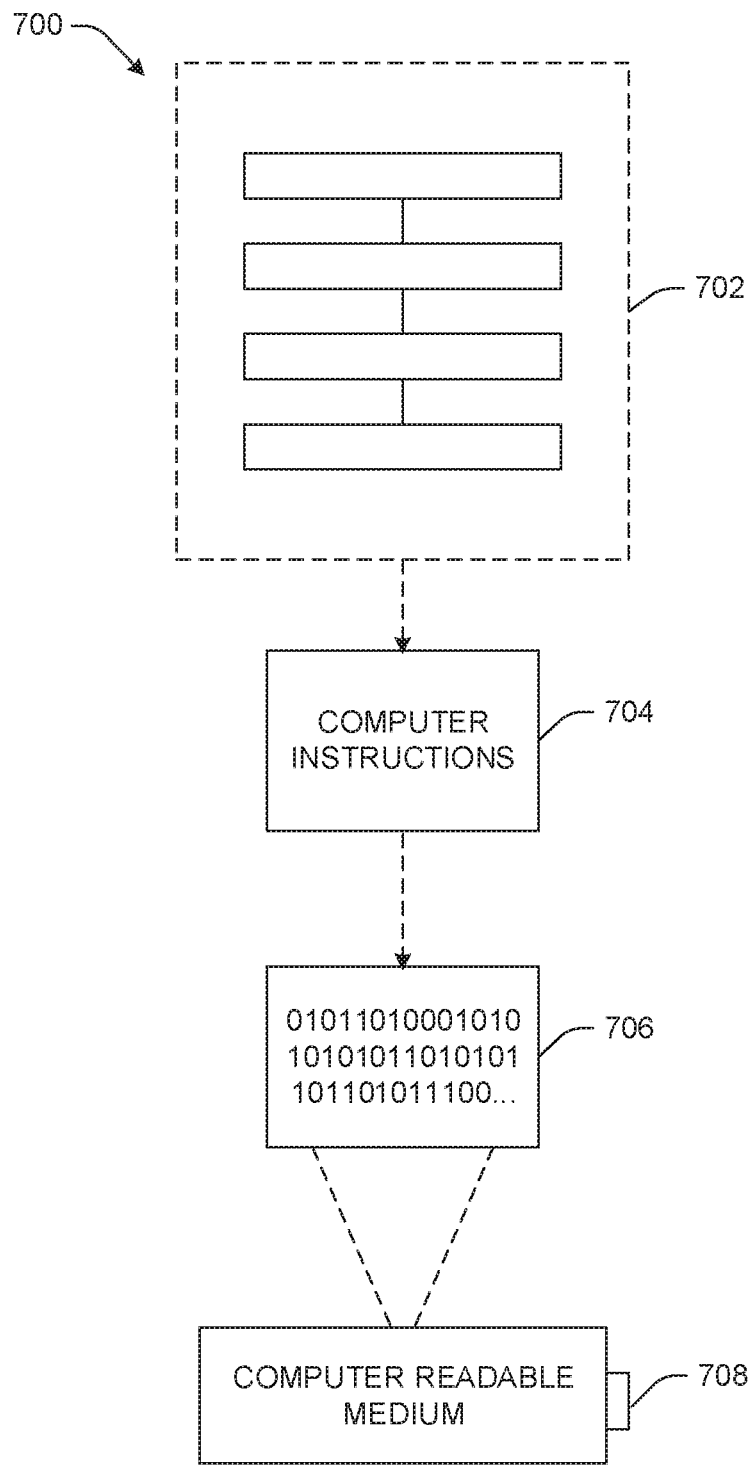
FIG. 7 illustrates an example, non-limiting computer-readable medium or computer-readable device including processor-executable instructions configured to embody one or more of the aspects set forth herein.

One or more implementations include a computer-readable medium including processor-executable instructions configured to implement one or more embodiments presented herein. An embodiment of a computer-readable medium or a computer-readable device devised in these ways is illustrated in FIG. 7, wherein an implementation 700 includes a computer-readable medium 702, such as a CD-R, DVD-R, flash drive, a platter of a hard disk drive, and so forth, on which is encoded computer-readable data 704. The computer-readable data 704, such as binary data including a plurality of zero's and one's as illustrated, in turn includes a set of computer instructions 706 configured to operate according to one or more of the principles set forth herein.

In the illustrated embodiment 700, the processor-executable computer instructions 706 may be configured to perform a method 708, such as the methods disclosed herein. In another embodiment, the processor-executable instructions 704 may be configured to implement a system, such as the systems disclosed herein. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
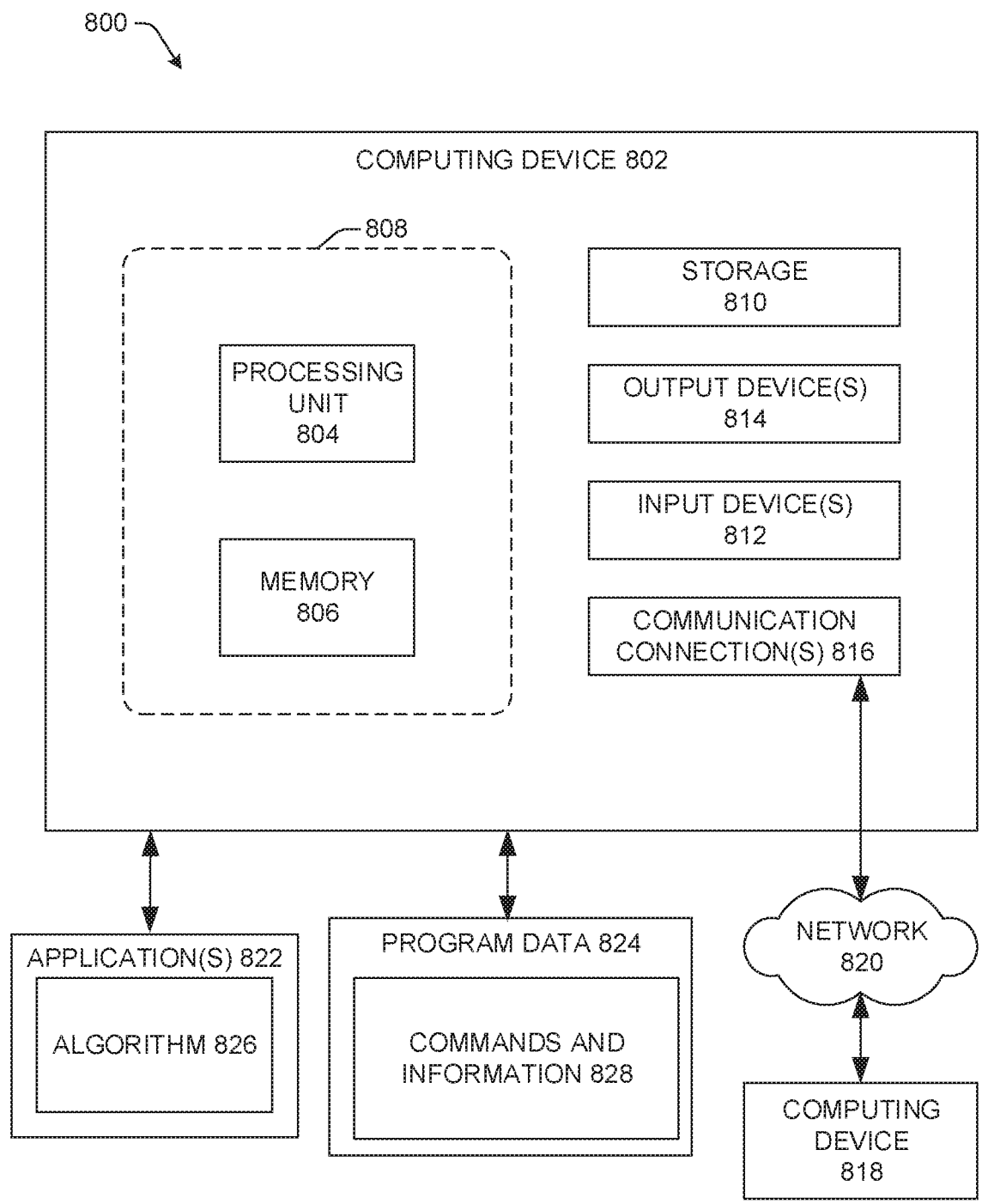
FIG. 8 illustrates an example, non-limiting computing environment where one or more of the aspects set forth herein are implemented, according to one or more aspects.

FIG. 8 and the following discussion provide a description of a suitable computing environment to implement embodiments of one or more of the aspects set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 that may include a computing device 802 configured to implement one or more embodiments provided herein. In one configuration, the computing device 802 may include at least one processing unit 804 and at least one memory 806. Depending on the exact configuration and type of computing device, the at least one memory 806 may be volatile, such as RAM, non-volatile, such as ROM, flash memory, etc., or a combination thereof. This configuration is illustrated in FIG. 8 by dashed line 808.

In other embodiments, the device 802 may include additional features or functionality. For example, the device 802 may include additional storage such as removable storage or non-removable storage, including, but not limited to, magnetic storage, optical storage, etc. Such additional storage is illustrated in FIG. 8 by storage 810. In one or more embodiments, computer readable instructions to implement one or more embodiments provided herein are in the storage 810. The storage 810 may store other computer readable instructions to implement an operating system, an application program, etc. Computer readable instructions may be loaded in the at least one memory 806 for execution by the at least one processing unit 804, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 802 may include input device(s) 812 such as keyboard, mouse, pen, voice input device, touch input device, infrared cameras, video input devices, or any other input device. Output device(s) 814 such as one or more displays, speakers, printers, or any other output device may be included with the device 802. The input device(s) 812 and the output device(s) 814 may be connected to the device 802 via a wired connection, wireless connection, or any combination thereof. In one or more embodiments, an input device or an output device from another computing device may be used as the input device(s) 812 and/or the output device(s) 814 for the device 802. Further, the device 802 may include communication connection(s) 816 to facilitate communications with one or more other devices, illustrated as a computing device 818 coupled over a network 820.

One or more applications 822 and/or program data 824 may be accessible by the computing device 802. According to some implementations, the application(s) 822 and/or program data 824 are included, at least in part, in the computing device 802. The application(s) 822 may include an algorithm 826 that is arranged to perform the functions as described herein including those described herein. The program data 824 may include commands and information 828 that may be useful for operation with the system and method disclosed herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
a processor coupled to a memory that includes instructions, that when executed by the processor, cause the processor to:
request a biometric signature for a user from a user device;
generate a first encrypted token based at least in part on the biometric signature;
return the first encrypted token to the user device that saves the first encrypted token to a secure location on the user device accessible by biometric authentication of the user on the user device;
determine whether a user identity can be confirmed based on the first encrypted token and a second encrypted token in conjunction with a validation request from a third party, the second encrypted token generated by the third party, saved on the user device, and specific to the third party, wherein the first encrypted token and the second encrypted token comprise the biometric signature of the user; and
communicate whether the user identity was confirmed or unconfirmed in response to the validation request.

2. The system of claim 1, the instructions further cause the processor to decrypt the first encrypted token and compare the biometric signature of the first encrypted token with the biometric signature of the user to determine whether the user identity is confirmed.

3. The system of claim 1, the instructions further cause the processor to communicate data regarding the user with confirmation of the user identity.

4. The system of claim 3, wherein data comprises at least one of a credit score, credit history, or risk score.

5. The system of claim 1, wherein the biometric signature is associated with one of a fingerprint or facial features.

6. The system of claim 1, wherein the system is shared by multiple financial institutions to confirm user identity.

7. A method, comprising:
requesting a biometric signature for a user from a user device;
generating a first encrypted token based at least in part on the biometric signature;
providing the first encrypted token to the user device that saves the first encrypted token to a secure location on the user device accessible by biometric authentication of the user on the user device;
determining whether a user identity can be confirmed based on the first encrypted token and a second encrypted token in conjunction with an authentication request from a third party, the second encrypted token generated by the third party, saved on the user device, and specific to the third party, wherein the first encrypted token and the second encrypted token comprise the biometric signature of the user; and
communicating whether the user identity was confirmed or unconfirmed in response to the authentication request.

8. The method of claim 7, further comprising:
decrypting the first encrypted token to reveal the biometric signature of the first encrypted token; and
comparing the biometric signature of the first encrypted token with the biometric signature of the user to determine whether the user is confirmed.

9. The method of claim 7, further comprising communicating data regarding the user with confirmation of the user identity.

10. The method of claim 9, further comprising communicating a risk score associated with the user with confirmation of the user identity.

11. The method of claim 7, further comprising:
decrypting the first encrypted token and the second encrypted token to reveal the biometric signatures; and
comparing the biometric signatures to the biometric signature of the user; and
confirming the user identity when the biometric signatures match the biometric signature of the user.

12. A method comprising:
executing, on a processor, instructions that cause the processor to perform operations comprising:
requesting a biometric signature of a user from a user device;
generating a first encrypted token based at least in part on the biometric signature;
providing the first encrypted token to the user device that saves the first encrypted token to a secure location on the user device accessible by biometric authentication of the user on the user device;
decrypting the first encrypted token and a second encrypted token in conjunction with an authentication request from a third party to reveal biometric signatures, the second encrypted token generated by the third party, saved on the user device, and specific to the third party, wherein the first encrypted token and the second encrypted token comprise the biometric signature of the user;
confirming an identity of the user when the biometric signatures match the biometric signature of the user; and
communicating confirmation of the identity of the user in response to the authentication request.

13. The method of claim 12, the operations further comprising communicating data regarding the user with the confirmation of the identity of the user.

14. The method of claim 13, the operations further comprising communicating a risk score of the user with the confirmation of the identity of the user.

* * * * *